UNITED STATES PATENT OFFICE.

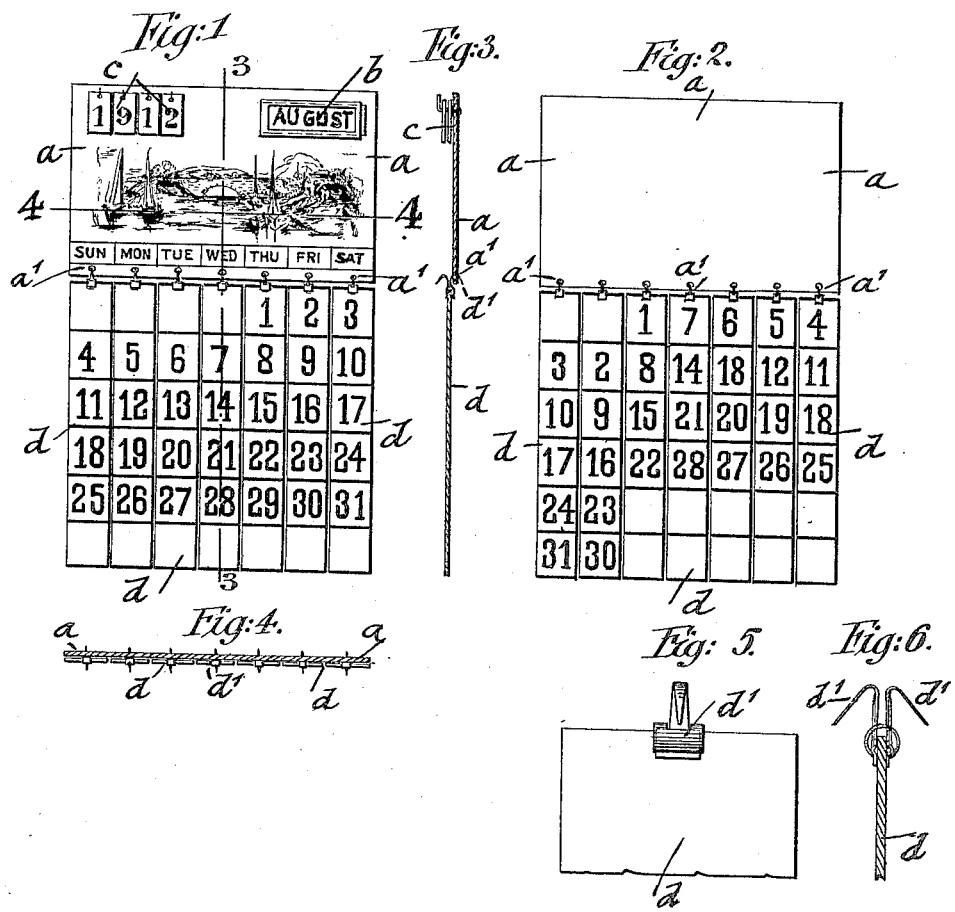

PAUL ARMSTRONG, OF NEW YORK, N. Y.

CALENDAR.

1,110,858.

Specification of Letters Patent. Patented Sept. 15, 1914.

Application filed September 28, 1912. Serial No. 722,941.

*To all whom it may concern:*

Be it known that I, PAUL ARMSTRONG, a citizen of the United States of America, residing in New York, in the borough of Manhattan, county and State of New York, have invented certain new and useful Improvements in Calendars, of which the following is a specification.

This invention relates to an improved so-called perpetual or everlasting calendar by means of which the days of the weeks, months and years can be adjusted so that the calendar can be used for any number of years, while it forms at the same time an effective medium for advertising purposes.

In the accompanying drawings, Figure 1 represents a front-elevation of my improved calendar, Fig. 2 is a rear-elevation of the same, Fig. 3 is a vertical transverse section on line 3, 3, Fig. 1, Fig. 4 is a horizontal section on line 4, 4, Fig. 1, Figs. 5 and 6 show a detail front-view and a side-view of a double hook for suspending the rows of days-tablets on the foundation-board.

Similar letters of reference indicate corresponding parts throughout the different figures of the drawings.

Referring to the drawings, $a$ represents the foundation-board of my improved calendar, which board is provided with the days of the week arranged transversely thereon. On the upper part of the foundation-board is preferably arranged an attractive picture, and above or sidewise of the same are placed transposable months-tablets $b$ and years-tablets $c$. The lower portion of the foundation-board $a$ is provided with eyelets $a^1$ from which are suspended seven rows of days-tablets $d$ by means of double suspension-hooks $d^1$ attached to the upper ends of the vertical rows of days-tablets. The rows of days-tablets are printed at their front and rear-faces with figures, at intervals of a week, corresponding to the days of the month and arranged in such a manner that when the first day of the month is properly arranged relatively to the corresponding day of the week, the figures run horizontally in consecutive numbers respectively below the corresponding days of the week, as shown in Fig. 1. On the rear-side of the rows of days-tablets are printed sufficient figures of corresponding days at intervals of a week so as to make up the days of the months for any year by hanging the rows of days-tablets in proper successive order into the eyelets of the foundation-board by means of the double suspension-hooks $d^1$ shown in Figs. 5 and 6. By suspending the rows of days-tablets in proper manner for each week under the days of the week, transposing the proper month at the front of the months-tablets and setting the years-tablets to the current year, the calendar can be used for any desired number of years, up to the end of the world.

By means of the transposable rows of days-tablets and the transposable months and years-tablets, a calender for counting-houses, stores, shops and family use is supplied, which can be readily adjusted from month to month and year to year by transposing at the beginning of every month the rows of days-tablets corresponding to the week-days of each month and transposing the months-tablets, while at the beginning of every year the years-tablets are changed correspondingly.

I claim:

1. A calendar comprising a foundation board provided with a fixed horizontal weekday indicator, and a plurality of vertical shiftable weekrow tablets bearing on their faces the monthday numbers for the respective weeks, each tablet having said numbers for a given week arranged in a vertical series, and individual suspension means severally connecting the upper ends of said vertical weekrow tablets with said foundation board opposite the respective day names indicated by said horizontal weekday indicator.

2. A calendar comprising a foundation board provided with a fixed horizontal weekday indicator, a plurality of vertical shiftable weekrow tablets having on their opposite faces monthday numbers for the respective weeks, each tablet having said numbers for a given week arranged in vertical series on each face, and duplex suspension means severally connecting the upper ends of said vertical weekrow tablets with said foundation board opposite the respective day names indicated by said horizontal weekday indicator and adapted to expose either face of said tablets.

In testimony, that I claim the foregoing as my invention, I have signed my name in presence of two subscribing witnesses.

PAUL ARMSTRONG.

Witnesses:
 PAUL GOEPEL,
 JOHN MURTAGH.

Copies of this patent may be obtained for five cents each, by addressing the "Commissioner of Patents, Washington, D. C."